US007463166B2

(12) United States Patent
Segura Gordillo et al.

(10) Patent No.: US 7,463,166 B2
(45) Date of Patent: Dec. 9, 2008

(54) CONTROL SYSTEM FOR THE OPERATION OF PRESENCE DETECTION DEVICES AND METHOD THEREFOR

(75) Inventors: Carlos Segura Gordillo, Les Franqueses Del Valles (ES); Francesc Daura Luna, Sant Quirze Del Valles (ES); Eduard Mundet Tarrago, Barcelona (ES)

(73) Assignee: Fico Mirrors, S.A., Barcelona (ES)

( * ) Notice: Subject to any disclaimer, the term of this patent is extended or adjusted under 35 U.S.C. 154(b) by 0 days.

(21) Appl. No.: 10/590,006

(22) PCT Filed: Feb. 20, 2004

(86) PCT No.: PCT/IB2004/000443

§ 371 (c)(1),
(2), (4) Date: Aug. 17, 2007

(87) PCT Pub. No.: WO2005/093686

PCT Pub. Date: Oct. 6, 2005

(65) Prior Publication Data

US 2008/0012696 A1 Jan. 17, 2008

(51) Int. Cl.
*B60Q 1/48* (2006.01)

(52) U.S. Cl. .............................. 340/932.2; 340/426.26; 340/426.28; 340/429; 340/430; 701/36

(58) Field of Classification Search .............. 340/932.2, 340/425.5, 426.24, 426.26, 426.28, 435, 340/429–430; 348/148; 342/70–72; 701/36–66, 701/45–47

See application file for complete search history.

(56) References Cited

U.S. PATENT DOCUMENTS 3,659,265 A * 4/1972 Eversull ..................... 340/429
5,467,283 A 11/1995 Butsuen et al.

(Continued)

FOREIGN PATENT DOCUMENTS

EP 0 930 200 A1 7/1999

(Continued)

OTHER PUBLICATIONS

International Search Report for PCT International Application No. PCT/IB2004/000443 mailed Jul. 27, 2004.

*Primary Examiner*—Jeff Hofsass
*Assistant Examiner*—Hongmin Fan
(74) *Attorney, Agent, or Firm*—RatnerPrestia

(57) ABSTRACT

The invention relates to a system for controlling the operation of presence-detection devices and to the implementation method thereof. The inventive system comprises: external presence detection means which are used to detect objects entering a determined surveillance area outside a motor vehicle and which are powered by a power source, an electronic system, and means which are used to detect the state of a closure device belonging to a door of said vehicle and which are associated with and co-operate with the electronic system in order to control the power source. Optionally, internal presence detection means and inclination detection means, which are included in the system, can be taken into account when said control operation is being performed. The inventive system also varies the surveillance area and adapts same as a function of the inclination of the vehicle in relation to the ground plane. The invention also relates to a method which uses the inventive control system.

25 Claims, 7 Drawing Sheets

U.S. PATENT DOCUMENTS

| | | | | |
|---|---|---|---|---|
| 5,525,843 | A | 6/1996 | Howing | |
| 6,873,824 | B2 * | 3/2005 | Flick | 455/41.2 |
| 2003/0075969 | A1 | 4/2003 | Fromme et al. | |
| 2004/0145458 | A1 * | 7/2004 | DiCroce | 340/426.1 |
| 2005/0116816 | A1 * | 6/2005 | Nitou | 340/426.1 |
| 2006/0152351 | A1 * | 7/2006 | Daura Luna et al. | 340/435 |

FOREIGN PATENT DOCUMENTS

| | | |
|---|---|---|
| ES | 2 009 417 | 9/1989 |
| ES | 2 158 827 | 9/2001 |
| WO | WO 01/61371 A2 | 8/2001 |

* cited by examiner

CONTROL SYSTEM FOR THE OPERATION OF PRESENCE DETECTION DEVICES AND METHOD THEREFOR

This application is a U.S. National Phase Application of PCT International Application No. PCT/IB2004/000443 filed Feb. 20, 2004.

TECHNICAL FIELD

This invention relates to a control system for the operation of the presence detection devices of an automobile for observing the area surrounding the vehicle in order to prevent accidental collisions, comprised of external detection means, supplied by a power source, an electronic system and means for detecting the condition or situation of locking/unlocking of the doors of said automobile and/or the presence of one or more people inside the vehicle, associated with and cooperating with said electronic system to control said power supply.

The invention also proposes a method for performing said control of the above-mentioned power supply using the proposed control system.

In a preferred application the system also operates by varying the observation area and adapting it according to the vehicle's tilt with respect to the ground's plane, owing to factors such as adding a load or people entering the vehicle.

BACKGROUND

Numerous external presence detection systems in the area surrounding a vehicle are known, generally applied to observing a particular observation area external to said vehicle, which covers a blind spot that is not satisfactorily covered by the view provided by the rear-view mirrors arranged on the vehicle, in order to thus improve the conditions designed to avoid potential risks of collision with other vehicles.

In general, the solutions described in said systems do not contemplate controlling the energy power supplies associated therewith, which however is very important bearing in mind the increasing consumption demands of latest generation vehicles, owing to the large number of electrical devices incorporated therein, and the priorities assigned in case the required consumption is greater than that can be supplied, because the batteries are too run down.

One of such external presence detection devices is proposed in Patent ES-A-2158827, in the name of the current applicant, which relates to an object presence detection device, of the type mounted on an automobile, having have at least one blind spot, where the detection device is suitable for detecting an object located in said blind spot and having: a receiver suitable for detecting electromagnetic waves, with a locating device, and a photo sensor which converts said received electromagnetic waves into electrical signals, an electronic circuit which analyses said signals and emits variable output signals according to the result of said analysis. Said patent does not refer to the way in which the detection device is powered, however it does claim that the detection device is adapted to act upon the door safety locks of said automobile, to prevent a passenger from exiting the vehicle if a dangerous situation is detected.

Patent ES-A-2009417 proposes a television operated rear-view mirror apparatus for automobiles, made up of a screen arranged on the dashboard, on which the images captured by one or various cameras arranged on the rear and/or side of the vehicle can be viewed. Said cameras are powered via the screen, which in turn receives its electrical supply from the vehicle's battery, generally when the ignition key is activated, although as an alternative it is also contemplated to include an additional switch for powering the screen and, consequently, the cameras, in the event that the vehicle is stopped and the key has not been activated.

It is obvious that the power supply control system is, in this background example, very basic, since it only depends on the ignition key and said additional switch, and does not contemplate other devices or other supplementary considerations.

One of said supplementary considerations is, for example, knowing whether, apart from whether the ignition key is activated or not, a passenger, preferably the driver, is inside the vehicle.

Various proposals are known to detect the presence of said driver, one of which is included in U.S. Pat. No. 5,525,843, relating to a system and a method for detecting an occupant on a seat in the vehicle. For this purpose said seat has been provided with at least one pair of electrodes, connected to a detection circuit entrusted with detecting a change in the capacity measured between said electrodes.

A more sophisticated example of a power supply system is that proposed in Patent Application EP-A-0930200. Said document discloses a time-controlled power supply device and an operating method using such a device. The application thereof relates generally to supplying an accessory in a motorized vehicle and, although it is not specifically claimed, an external presence detector device could be understood as one of said accessories.

Said background example does not contemplate the operation of any other device that does not include a timed supply. In particular, power is supplied to an accessory for a certain time, if not too much time has elapsed, the vehicle ignition is deactivated and the vehicle is not closed. If the presence of a passenger is detected said predetermined time is restarted, and so the timer is activated again from zero. The detection of the presence of passengers is based here on the use or not of a series of devices belonging to the automobile, such as its air-conditioning.

To summarize, what said background example intends is that it is possible to use a series of electrical automobile devices when said automobile is stopped, including its ignition, thus ruling out that one of said devices is an external presence detection device designed to be used with the vehicle running.

It is interesting to provide an alternative to the prior art, which combines the advantages of the previous background examples, that is, the possibility of providing a suitable power supply to an automobile's external presence detection device, wherein the timing of said supply is only one of the possible strategies to be used, which bears in mind, in addition to other parameters, the entry and/or presence of a passenger in said automobile, and which, in short, guarantees the safety of the vehicle occupants, either when the vehicle is running or stopped, using said external presence detection device, without said device consuming an excessive amount of current.

BRIEF DESCRIPTION

This invention relates to a control system for the operation of the presence detection devices of an automobile, such as cameras, radar or magnetic field distortion detection devices, which comprises in combination:

a) external presence detection means, to detect the entry of objects in a particular area of observation external to said automobile;

b) at least one power source for supplying at least said external presence detection means;

c) an electronic system comprising at least some means for processing and analyzing the first entry signals obtained by said external presence detection means and which produces first output signals according to the result of said analysis, and d) means for detecting the condition of at least one closing device of at least one door of said automobile, which are associated with and cooperate with said electronic system.

One innovative idea proposed by this invention is that of providing control for said power supply, which is performed by said electronic system, according to the condition, situation of locking/unlocking, or opening and closing sequence of at least said closing device of said door, of which there is at least one, of said automobile. The object of the above is that the external presence detection means are powered when the vehicle user is inside said vehicle or nearby, and may be exposed to a potentially dangerous situation, with the vehicle running or stopped.

In order to improve the detection of the entry or exit of said user or passenger, the proposed system also includes internal presence detection means, such as a weight or capacity sensor arranged on at least one of the automobile seats, which is associated with and cooperates with the electronic system to control said power supply, also according to the presence or absence of people inside the automobile.

Tilt detection means, incorporated in the system, are associated with and cooperate with said condition detection means of at least one closing device of at least one door of the automobile and said internal presence detection means, to produce second input signals for the electronic system, also according to the vehicle's tilt with respect to the plane of the ground on which the automobile is standing, conditioned by various circumstances such as load, the presence of passengers or braking, thanks to said tilt detection means. Said signals, once analyzed by the electronic system, are used by said system, first of all, to improve said presence detection, distinguishing when the vehicle tilts really because a passenger is entering the vehicle or for another reason.

Secondly, the electronic system uses the second signals obtained from said tilt detection means to vary, as soon as the vehicle starts to move or once it has stopped, the area of observation to be covered by said external presence detection means, according to the vehicle's tilt with respect to the plane of the ground on which said vehicle is standing, and with the detection therefore adjusting both the weight borne by the vehicle and the various circumstances or real driving situations, since the route is normally variable, including bends, irregular ground surface, etc.

The invention also proposes a control method that uses the proposed system to control the power supply connected to the external presence detection means, by activating or deactivating it, according to some or all of the detection means incorporated in the system, individually or in combination, via various control strategies, some of which result in timing said supply.

BRIEF DESCRIPTION OF THE DRAWINGS

The characteristics and advantages of the invention and others will become clearer from the following description of a series of exemplary embodiments, some of which are illustrated in the attached drawings and must be considered as illustrative and not limiting.

In said drawings.

DETAILED DESCRIPTION OF SOME EXEMPLARY EMBODIMENTS

Figure 1:
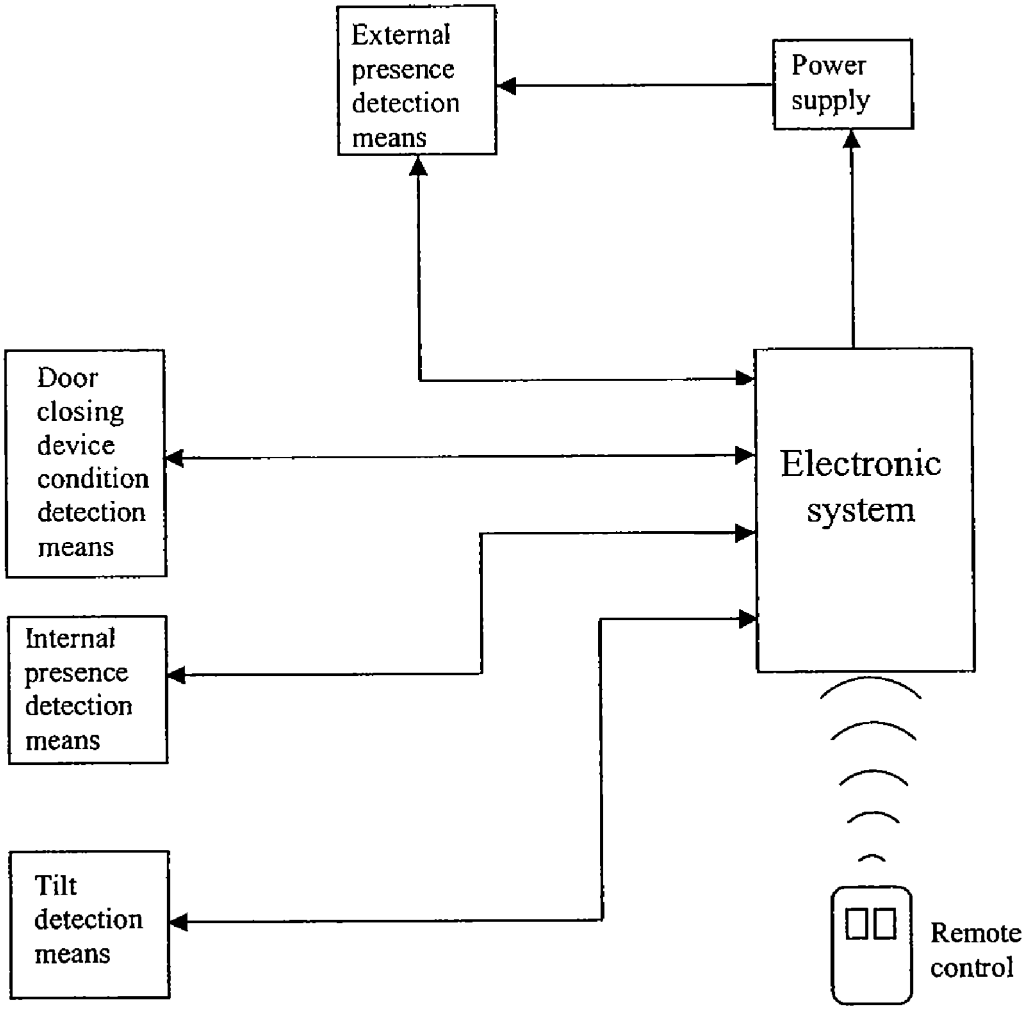
FIG. 1 is a diagrammatic representation of an exemplary embodiment of the present invention.

As shown in FIG. 1, the control system for the presence detection devices of an automobile proposed by this invention comprises in combination:

a) external presence detection means 4 for detecting the entry of objects in a particular area of observation outside said automobile;

b) at least one power supply 5 for supplying at least said external presence detection means 4;

c) an electronic system 6 comprising at least means for processing and analyzing first input signals obtained by said external presence detection means 4 and which produces first output signals according to the result of said analysis, and d) condition detection means 7 of at least one closing device of at least one door of said automobile, which are associated with and cooperate with said electronic system 6.

Said external presence detection means 4 include at least one electromagnetic detection device, such as a camera, an infra-red system, a radar system and an ultrasound system, or a combination thereof, according to the exemplary embodiment.

For another exemplary embodiment said external presence detection means 4 include at least one magnetic field distortion detection device, on its own or in combination with said electromagnetic detection means.

A preferred exemplary embodiment includes two of said electromagnetic detection devices and two of said magnetic field distortion detection devices, one on each side of the automobile mounted, at least partially, in the automobile's respective external rear-view mirror housings.

All these devices have in common that they are used to supervise an area of observation outside the automobile on which they are mounted, which covers at least one blind spot, not covered when using a simple rear-view mirror.

By means of this invention said devices do no consume an excessive amount of current, which subsequently quickly runs down the vehicle battery used to power them, while guaranteeing the safety that they can provide for vehicle passenger(s), whenever necessary, with respect to the possible existence of risk situations for said passengers.

Therefore the power supply 5 connected to said devices through said electronic system 6 is controlled, generally by activating or deactivating it, according to the condition, situation of the locking/unlocking, or opening and closing sequence of at least said closing device of said automobile door, of which there is at least one, preferably the driver's.

The system also includes, in another more detailed exemplary embodiment, internal presence detection means 8, which are associated with and cooperate with said electronic system 6 to perform said control of power supply 5, also according to the presence or absence of people inside the automobile.

Said internal presence detection means 8, according to the exemplary embodiment, include at least one device comprised in a group that includes at least one weight sensor, at least one capacity sensor, arranged on at least one seat of the automobile, at least one infra-red detector, at least one microwave detector and at least one camera, arranged in the vehicle interior, or a combination thereof.

In a preferred exemplary embodiment the system also includes tilt detection means 9, which are associated with and cooperate with said condition detection means 7 of at least one closing device of at least one automobile door and said internal presence detection means 8, to produce second input signals for electronic system 6, also according to the vehicle's tilt with respect to the plane of the ground on which the vehicle is standing, conditioned by various circumstances, either with the vehicle stopped or running, a static or dynamic detection therefore being produced thanks to said tilt detection means. Some examples of such circumstances which may affect the vehicle are: load, presence of passengers, braking or changes in gradient.

Said tilt detection means 9 are associated with and cooperate with said electronic system 6, in an additional embodiment, as soon as the vehicle starts to move or once it has stopped, to vary the area of observation to be covered by external presence detection means 4, according to the vehicle's tilt with respect to the plane of the ground on which said vehicle is standing.

Electronic system 6 includes, preferably, at least one timer and/or at least one remote control, associated with and cooperating with at least condition detection means 7 of said closing device of said automobile door, to control said power supply 5.

The invention also proposes a method for controlling the operation of automobile presence detection devices, using the control system proposed and described above.

The method includes controlling power supply 5 connected to said external presence detection device 4, by said electronic system 6, according to the condition, situation of locking/unlocking, or opening and closing sequence of at least said closing device of at least said automobile door, of which there is at least one, preferably the driver's, in an exemplary embodiment, as well as according to the state, i.e.: activated or deactivated, of the vehicle's ignition.

Figure 2:
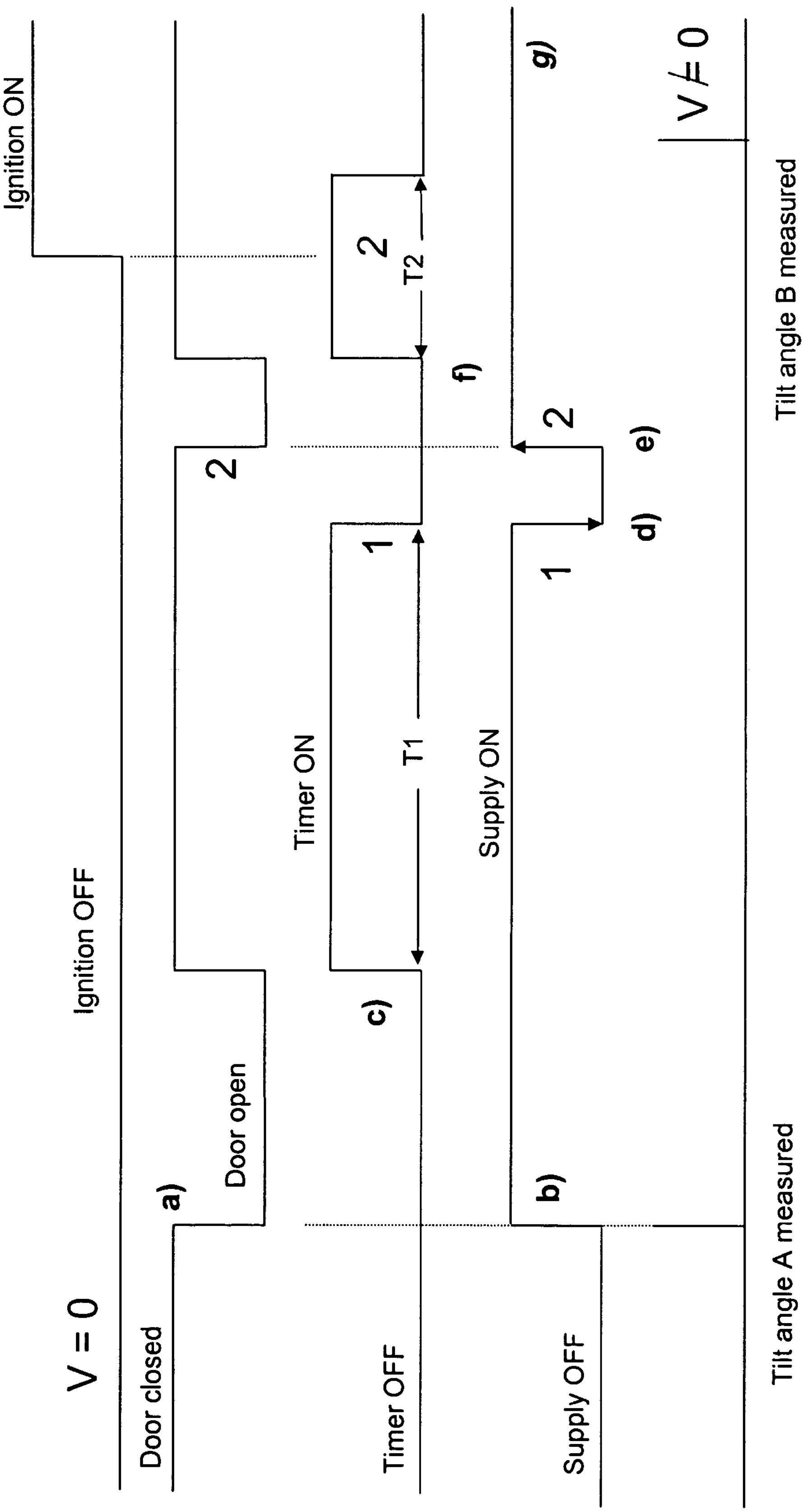
FIG. 2 is a timing diagram representing one of the possible strategies for controlling the power supply provided by an exemplary method proposed by this invention, for an exemplary embodiment, for activating the supply, taking into account the condition of a door closing device.
Figure 3:
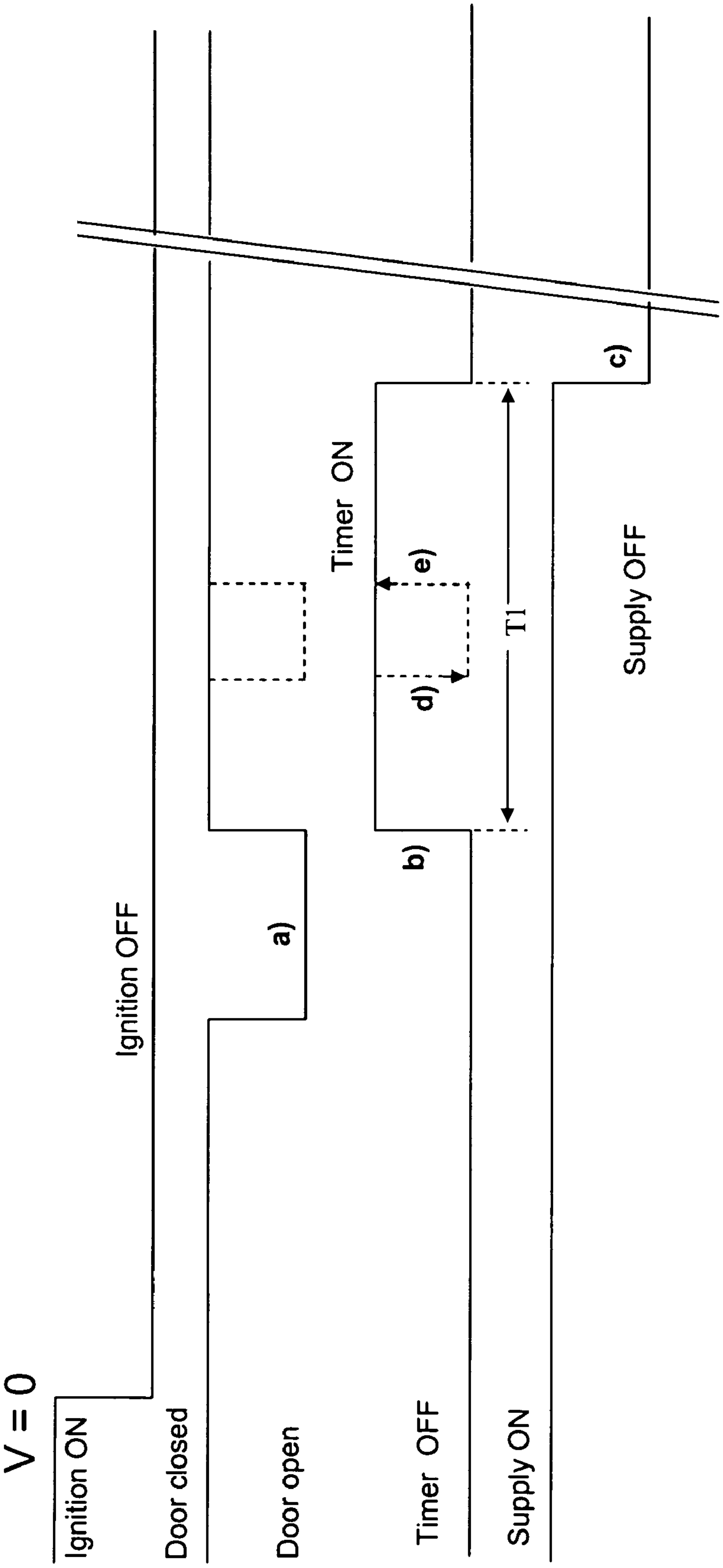
FIG. 3 represents another exemplary timing diagram, for the same exemplary embodiment as in FIG. 2, which shows the signals taken into consideration by the proposed method for a power supply deactivation strategy.

FIGS. 2 and 3 show two strategies for controlling power supply 5 in said exemplary embodiment: FIG. 2 is a strategy for activating the supply and FIG. 3 is a strategy for deactivating it.

Specifically, as shown in FIG. 2, the proposed control method, when power supply 5 and the vehicle ignition are deactivated and the vehicle itself is stopped (V=0 in the figures), includes the following steps (indicated in the figure by reference number 1):

a) detect an action to open a door, b) activate power supply 5 following said detection, c) activate a timer incorporated in electronic system 6, when closing the door, for a time T1, maintaining power supply 5 activated, and d) deactivate power supply 5 if after said time T1 vehicle ignition is not activated.

In another exemplary embodiment not shown said step a) could consist, alternatively, in the detection of a door opening and closing sequence.

The proposed control method also includes in the exemplary embodiment shown in FIG. 2 (reference number 2) after said step d), the following steps:

e) reactivate power supply 5 if step d) has been performed and a second door opening action has been detected, f) reactivate said timer, for a time T2, when closing the door, and g) maintain power supply 5 if before said time T2 elapses vehicle ignition has been activated.

In another exemplary embodiment not shown said step e) could consist, alternatively, in the detection of a door opening and closing sequence, and after said step g) the timer could be deactivated.

A step to deactivate power supply 5 in the same exemplary embodiment in FIG. 2 is shown in FIG. 3, where it can be seen how the proposed control method, when power supply 5 is activated and the vehicle ignition is deactivated and the vehicle itself is also stopped, includes the following steps:

a) detect a door opening and closing sequence, b) activate a timer incorporated in electronic system 6, for a time T1, and c) deactivate power supply 5 if after said time T1 vehicle ignition has still not be activated.

As an alternative to step c) the method also includes, after said step b), the following step:

d) deactivate the timer if a second door opening action has been detected (indicated by dotted lines in FIG. 3), and, preferably, the following step:

e) reactivate the timer if a second door closing action has been detected (indicated by dotted lines in FIG. 3).

In a preferred exemplary embodiment said times T1 and T2 are equal and approximately five minutes long, although they could be different and have other values if required by the embodiment.

The method also includes, in another exemplary embodiment, controlling said power supply 5, through said electronic system 6, also according to the presence or absence of people inside the automobile, using internal presence detection means 8, which are associated with and cooperate with said electronic system 6.

Figure 4:
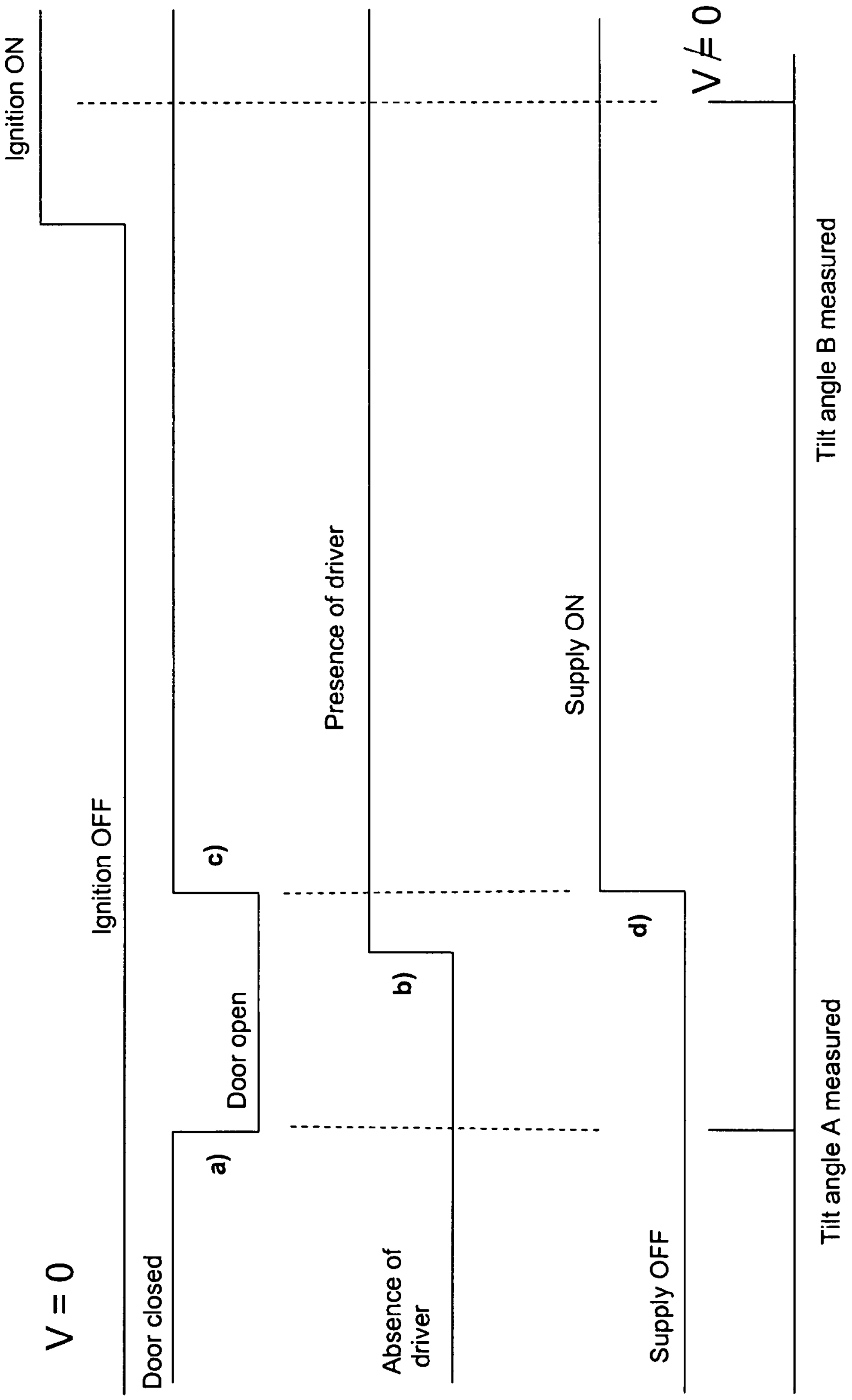
FIG. 4 shows the evolution of a series of signals taken into consideration by the method proposed by this invention to activate the power supply, for another exemplary embodiment, using a strategy that contemplates using an internal presence detector arranged in the vehicle to control said activation.
Figure 5:
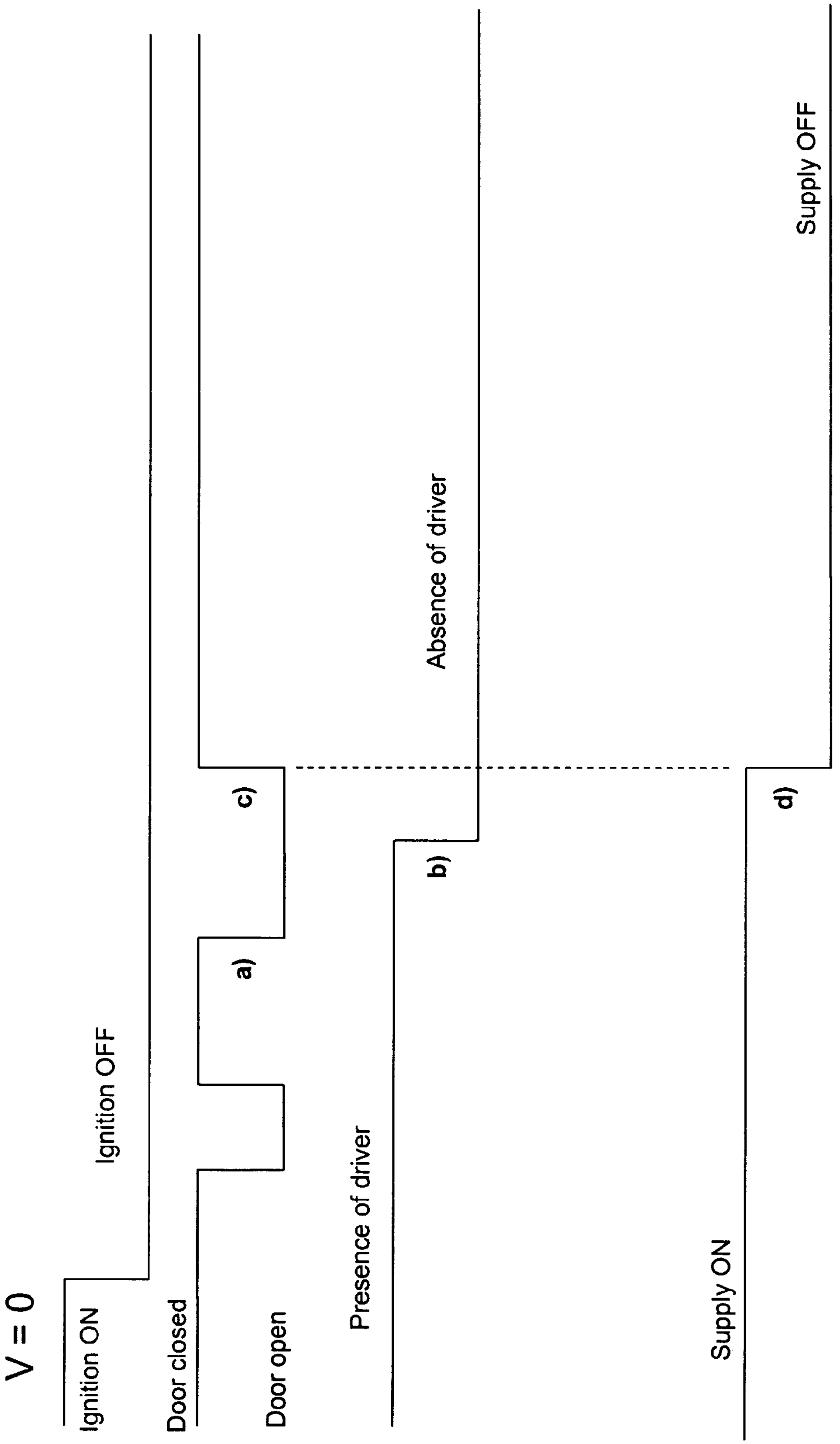
FIG. 5 represents another timing diagram, for the same exemplary embodiment as in FIG. 4, which shows the same signals indicated by said figure for a power supply deactivation strategy which takes into account said internal presence detection means, FIG. 6, following the type of representation in the immediately preceding figures, shows another exemplary embodiment of the method of this invention, in which a power supply control strategy is based on activating said power supply by taking into account a signal originating from a remote control, and FIG. 7, indicates the deactivation of said supply, for the same exemplary embodiment as in FIG. 6, also with a control strategy designed according to the reception of a signal originating from said remote control.

Possible control strategies for performing said control are shown in FIGS. 4 and 5, the first of which refers to activating power supply 5, and the second to deactivating it.

FIG. 4 shows how, when power supply 5 and the vehicle ignition are deactivated and the vehicle itself is stopped, the method includes the following steps:

a) detect a door opening action, b) detect the presence of at least one person inside the vehicle, preferably the driver, using the said internal presence detection means 8, c) detect a door closing action, and d) activate power supply 5 following said detections.

FIG. 5 shows how, when power supply 5 is activated, vehicle ignition is deactivated and the vehicle itself is also stopped, the method includes the following steps:

a) detect a door opening action, b) detect the absence of a person, preferably the driver, who was inside the vehicle, using said internal presence detection means 8, c) detect a door closing action, and d) deactivate power supply 5 following said detections.

Figure 6:
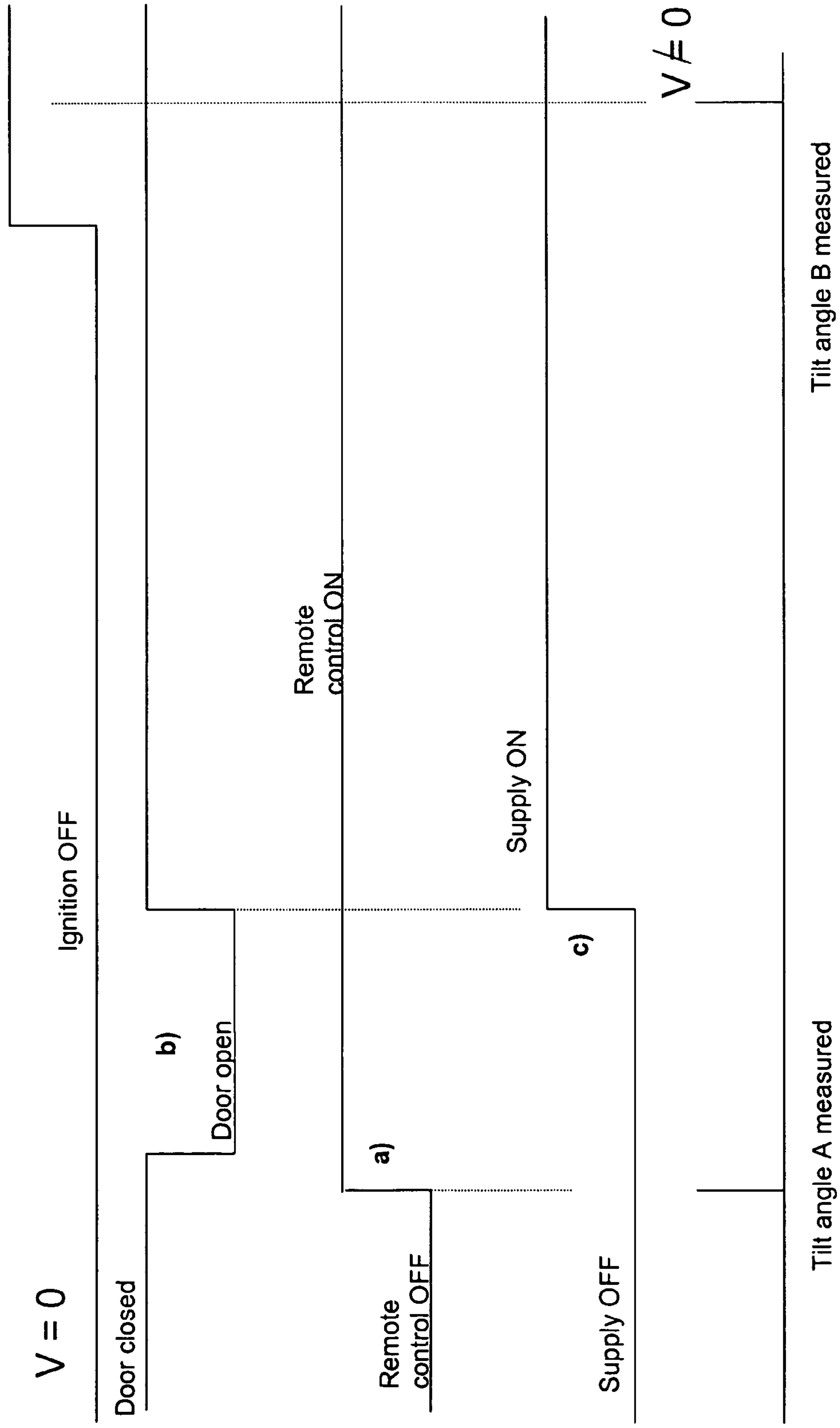
Figure 7:
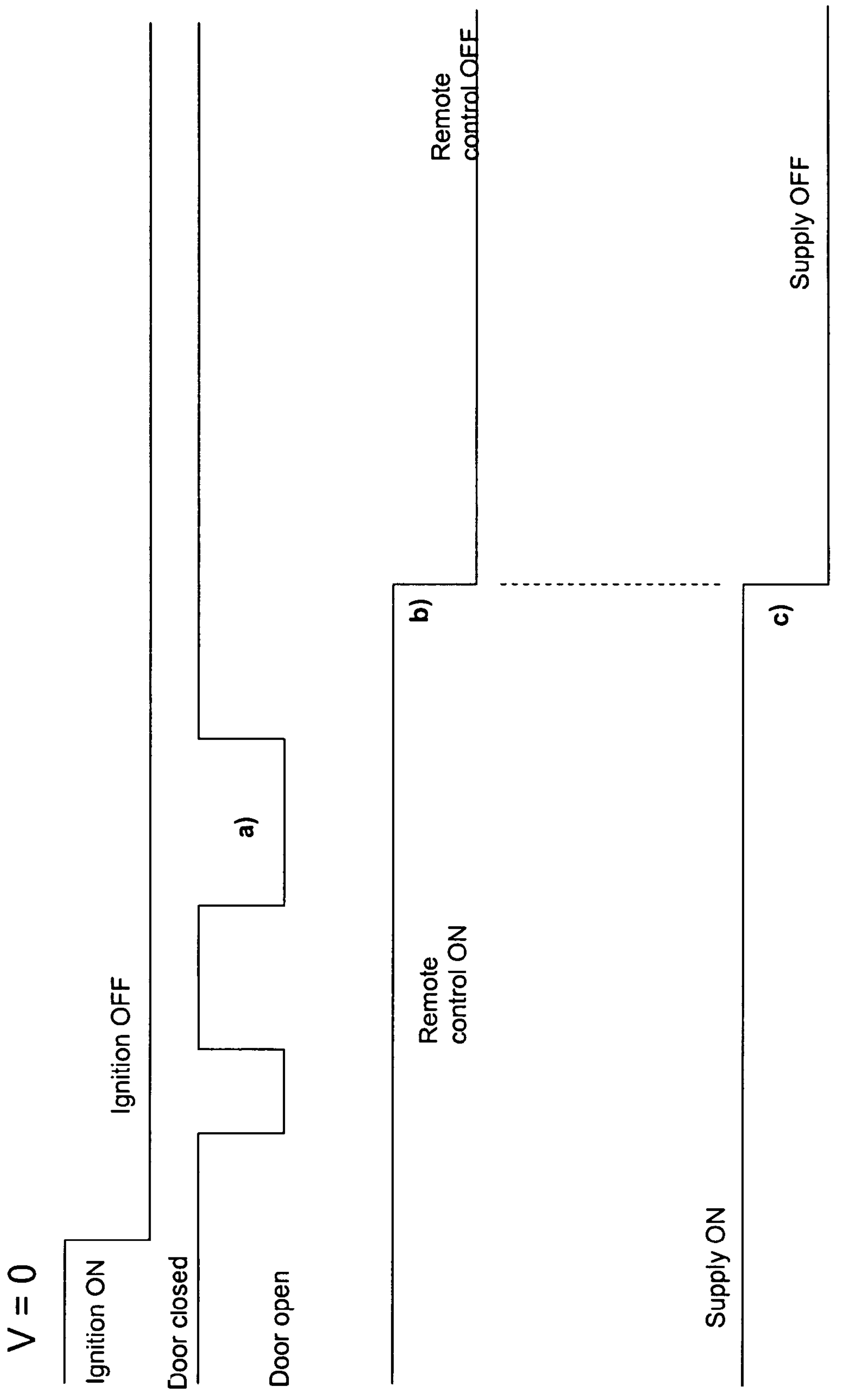

Another exemplary embodiment of the method that is the object of this invention is that shown in FIGS. 6 and 7, which represent, respectively, a strategy for controlling power supply 5 based on activating it by taking into account a signal originating from a remote control, and a control strategy designed according to the reception of a signal originating from said remote control.

Specifically the strategy in FIG. 6 is applicable when power supply 5 and vehicle ignition are deactivated and the vehicle itself is also stopped, and includes the following steps:

a) detect an activation signal from a remote control, or key, included in electronic system 6, b) detect a door opening and closing sequence, and c) activate power supply 5 following said detections.

And the strategy shown in FIG. 7 is applicable when power supply 5 is activated, the vehicle ignition is deactivated and the vehicle itself is also stopped, and includes the following steps:

a) detect a door opening and closing sequence, b) detect a deactivating signal from a remote control, or key, included in electronic system 6, and c) deactivate power supply 5 following said detection.

In order to increase the number of parameters to be taken into account when controlling the external presence detector in a suitable manner, the method also includes producing second input signals for electronic system 6, also according to the vehicle's tilt with respect to the plane of the ground on which said vehicle is standing, conditioned by various circumstances, such as load, presence of passengers, braking or tilt changes during the trajectory, tilt detection means 9 already explained in the preceding system description being used for this purpose.

To this end, the proposed control method includes detecting the vehicle's tilt when ignition is deactivated, the vehicle is stopped (V=0 in the figures) and a door opening action has been detected, thus obtaining a first reading or tilt angle A, and it also includes detecting the vehicle's tilt when ignition is activated and the vehicle is running ($V\neq0$ in the figures), obtaining a second reading or tilt angle B.

Taking into account said two tilt angles A, B and an initial reference angle measured before opening any door, it is possible to distinguish the tilt caused by the ground from that caused by weight, and by also taking into account the detection performed by internal presence detection means 8, using this method, it is possible to distinguish the weight caused by a passenger entering the vehicle from that caused, for example, by loading luggage into the boot of the vehicle, with the vehicle tilt, internal presence 8 and door opening/closing detections complementing each other for an improved control of power supply 5, thanks to the consideration of a wider range of possible circumstances.

This control method also contemplates varying the observation area to be covered by said external presence detection means 4, as soon as the vehicle starts to move or once it has stopped, according to the vehicle's tilt with respect to the plane of the ground on which the vehicle is standing, using for this purpose said tilt detection means, which are associated and cooperate with said electronic system 6.

The preceding exemplary embodiments relating to the proposed method could be combined to obtain various, numerous strategies for controlling power supply 5 connected to the presence device, according to some or all of the detailed detection means, it being possible to base said control on activating and/or deactivating the timed or non-timed supply.

Therefore it is necessary to highlight that, both regarding the method and the proposed system, a person skilled in the art could introduce changes and modifications to the described exemplary embodiments without departing from the scope of the invention as defined in the attached claims.

The invention claimed is:

1. A system for controlling the operation of presence detection devices in a motor vehicle, which comprises in combination:

a) external presence detection means for detecting the entry of objects in a certain observation area outside said vehicle;

b) at least one power supply for supplying at least said external presence detection means;

c) an electronic system including at least means for processing and analyzing first input signals obtained by said external presence detection means and which produces first output signals according to the result of said analysis;

d) condition detection means of at least one closing device of at least one door of said automobile, associated and cooperating with said electronic system;

e) internal presence detection means, which are associated with and cooperate with said electronic system to control said power supply, according to a presence or absence of people inside the vehicle; and f) tilt detection means, which are associated with and cooperate with said condition detection means of at said least one closing device of at said least one vehicle door and said internal presence detection means, to produce second input signals for said electronic system, according to the vehicle's tilt with respect to a plane of the ground on which said vehicle is standing, conditioned by various circumstances such as load, presence of passengers or braking, based on said tilt detection means, wherein said tilt detection means are associated with and cooperate with said electronic system, when the vehicle starts to move or once it has stopped, to vary the area of observation to be covered by said external presence detection means, according to the vehicle's tilt with respect to the plane of the ground on which said vehicle is standing, and said power supply is controlled by said electronic system, according to the opening and closing sequence of at least said closing device of said door, of which there is at least one, of said vehicle, obtained by said condition detection means.

2. The control system according to claim 1, wherein said electronic system comprises at least one timer and/or at least one remote control, which are associated with and cooperate with at least said condition detection means of said closing device of said automobile door, to control said power supply.

3. The control system according to claim 1, wherein the control of said power supply includes activating or deactivating said power supply by means of said electronic system.

4. The control system according to claim 1, wherein said external presence detection means comprises at least one electromagnetic detection device.

5. The control system according to claim 4, wherein said electromagnetic detection device comprises at least one element selected from the group consisting of a camera, an infra-red system, a radar system and an ultrasound system, or any combination thereof.

6. The control system according to claim 1, wherein said external presence detection means includes at least one magnetic field distortion detection device.

7. The control system according to claim 4, wherein said external presence detection means also includes at least one magnetic field distortion detection device in combination with said electromagnetic detection device, of which there is at least one.

8. The control system according to claim 7, wherein it includes at least two of said electromagnetic detection devices and/or at least two of said magnetic field distortion detection devices, one on each side of the automobile.

9. The control system according to claim 7 wherein the electromagnetic detection devices and/or the magnetic field distortion detection devices are mounted, at least partially, in respective external rear-view mirror housings on said automobile.

10. The control system according to claim 1, wherein said external area of observation exterior covers at least one blind spot.

11. The control system according to claim 1, wherein said internal presence detection means include at least one device selected from the group consisting of at least one weight sensor, at least one capacity sensor, arranged on at least one automobile seat, at least one infra-red detector, at least one microwave detector and at least one camera, arranged inside the vehicle, or any combination thereof.

12. A control method for the operation of presence detection devices in a motor vehicle, comprising:

detecting, using an external presence detection means, the entry of objects in a certain area of observation external to said vehicle;

powering, with at least one power supply, at least said external presence detection Means;

processing and analyzing, with an electronic system, first input signals obtained by said external presence detection means, said electronic system producing first output signals according to the result of said analysis;

determining a condition, using a condition detection means, of at least one closing device of at least one automobile door, which are associated with and cooperate with said electronic system; and controlling said power supply, by means of said electronic system, according to:

a) the opening and closing sequence of at least said closing device of said vehicle door, of which there is at least one, based on said condition obtained by said condition detection means, b) a presence or absence of people inside the vehicle, using an internal presence detection means, which are associated with and cooperate with said electronic system, and c) according to the activated or deactivated condition of the vehicle ignition, wherein, when said power supply and the vehicle ignition are deactivated and the vehicle itself is also stopped, it comprises the following steps:

a) detecting a door opening action or opening and closing sequence, b) activating said power supply following said detections, c) activating a timer included in said electronic system, when closing said door, for a time T1, maintaining power supply activated, and d) deactivating said power supply if after said time T1 the vehicle ignition is still not activated.

13. The control method according to claim 12, further comprising, after said step d), the following steps:

e) reactivating said power supply if step d) has been performed and a second door opening action or opening and closing sequence has been detected, f) reactivating said timer, for a time T2, when closing the door, and g) maintaining said power supply activated if after said time T2 the vehicle ignition has been activated.

14. The control method according to claim 13, wherein said times T1 and T2 are equal.

15. A control method for the operation of presence detection devices in a motor vehicle, comprising:

detecting, using an external presence detection means, the entry of objects in a certain area of observation external to said vehicle;

powering, with at least one power supply, at least said external presence detection means;

processing and analyzing, with an electronic system, first input signals obtained by said external presence detection means, said electronic system producing first output signals according to the result of said analysis;

determining a condition, using a condition detection means, of at least one closing device of at least one automobile door, which are associated with and cooperate with said electronic system; and controlling said cower supply, by means of said electronic system, according to:

a) the opening and closing sequence of at least said closing device of said vehicle door, of which there is at least one, based on said condition obtained by said condition detection means, b) a presence or absence of people inside the vehicle, using an internal presence detection means, which are associated with and cooperate with said electronic system, and c) according to the activated or deactivated condition of the vehicle ignition, wherein, when said power supply is activated and the vehicle ignition is deactivated and the vehicle itself is also stopped, it comprises the following steps:

a) detecting a door opening and closing sequence, b) activating a timer incorporated in electronic system, for a time T1, and c) deactivating said power supply if after said time T1 the vehicle ignition has still not been activated.

16. The control method according to claim 15, further comprising, after said step b), the following step, as an alternative to step c):

d) deactivating the timer if a second door opening action has been detected.

17. The control method according to claim 16, further comprising, after said step d), the following step:

e) reactivating the timer if a second door closing action has been detected.

18. The control method according to claim 12 wherein when power supply and the vehicle ignition are deactivated and the vehicle itself is stopped, it comprises the following steps:

a) detecting a door opening action, b) detecting a presence of at least one person inside the vehicle, using the said internal presence detection means, c) detecting a closing action of said door, and d) activating said power supply following said detections.

19. The control method according to claim 12 wherein when said power supply is activated, the vehicle ignition is deactivated and the vehicle itself is stopped, it comprises the following steps:

a) detecting a door opening action, b) detecting the absence of a person who was inside the vehicle, using said internal presence detection means, c) detecting a closing action of said door, and d) deactivating said power supply following said detections.

20. The control method according to claim 12 further comprising producing second input signals for electronic system, also according to the vehicle's tilt with respect to the plane of the ground on which the vehicle is standing, conditioned by various circumstances such as load, presence of passengers or braking, using for this purpose tilt detection means, which are associated with and cooperate with said condition detection means of at least one closing device of at least one automobile door and said internal presence detection means.

21. The control method according to claim 20, further comprising varying the area of observation to be covered by said external presence detection means, when the vehicle starts to move or once it has stopped, according to the vehicle's tilt with respect to the plane of the ground on which the vehicle is standing, using for this purpose said tilt detection means, which are associated with and cooperate with said electronic system.

22. The control method according to claim 20, further comprising detecting the vehicle's tilt when the ignition is deactivated, the vehicle is stopped and a door opening action has been detected.

23. The control method according to claim 22, further comprising detecting the vehicle's tilt when the ignition is activated and the vehicle is running.

24. A control method for the operation of presence detection devices in a motor vehicle, comprising:

detecting, using an external presence detection means, the entry of objects in a certain area of observation external to said vehicle;

powering, with at least one power supply, at least said external presence detection means;

processing and analyzing, with an electronic system, first input signals obtained by said external presence detection means, said electronic system producing first output signals according to the result of said analysis;

determining a condition, using a condition detection means, of at least one closing device of at least one automobile door, which are associated with and cooperate with said electronic system; and controlling said power supply, by means of said electronic system, according to:

a) the opening and closing sequence of at least said closing device of said vehicle door, of which there is at least one, based on said condition obtained by said condition detection means, b) a presence or absence of people inside the vehicle, using an internal presence detection means, which are associated with and cooperate with said electronic system, and c) according to the activated or deactivated condition of the vehicle ignition, wherein when said power supply and the vehicle ignition are deactivated and the vehicle itself is also stopped, it comprises the following steps:

a) detecting an activation signal from a remote control, or key, included in electronic system, b) detecting a door opening and closing sequence, and c) activating said power supply following said detections.

25. A control method for the operation of presence detection devices in a motor vehicle, comprising:

detecting, using an external presence detection means, the entry of objects in a certain area of observation external to said vehicle;

powering, with at least one power supply, at least said external presence detection means;

processing and analyzing, with an electronic system, first input signals obtained by said external presence detection means, said electronic system producing first output signals according to the result of said analysis;

determining a condition, using a condition detection means, of at least one closing device of at least one automobile door, which are associated with and cooperate with said electronic system; and controlling said power supply, by means of said electronic system, according to:

a) the opening and closing sequence of at least said closing device of said vehicle door, of which there is at least one, based on said condition obtained by said condition detection means, b) a presence or absence of people inside the vehicle, using an internal presence detection means, which are associated with and cooperate with said electronic system, and c) according to the activated or deactivated condition of the vehicle ignition, wherein when power supply is activated, the vehicle ignition is deactivated and the vehicle itself is also stopped, it comprises the following steps:

a) detecting a door opening and closing sequence, b) detecting a deactivating signal from a remote control, or key, included in electronic system, and c) deactivating said power supply following said detection.

* * * * *